United States Patent
Wood, III et al.

[15] 3,680,287
[45] Aug. 1, 1972

[54] AIR FILTER

[72] Inventors: Charles Drury Wood, III, San Antonio, Tex.; Sydney Alvin Olsen; Jimmie Clinton Potter, Cedar Falls, both of Iowa

[73] Assignee: Deere & Company, Moline, Ill.

[22] Filed: Oct. 9, 1970

[21] Appl. No.: 79,513

[52] U.S. Cl. ..................55/524, 55/512, 55/529, 210/496, 210/510
[51] Int. Cl. ..............................................B01d 25/08
[58] Field of Search..................55/497–499, 521, 55/512–514, 522, 523, 524, 529; 264/126; 210/510, 496, 493; 261/94–99; 161/159, 109; 260/2.5 B

[56] References Cited

UNITED STATES PATENTS

| | | | |
|---|---|---|---|
| 2,371,868 | 3/1945 | Berg et al. | 264/126 |
| 2,745,141 | 5/1956 | Brennan | 210/510 |
| 2,745,513 | 5/1956 | Massey | 55/523 |
| 2,804,936 | 9/1957 | Stampe | 55/512 |
| 3,048,537 | 8/1962 | Pall et al. | 264/126 |
| 3,291,310 | 12/1966 | Marvel | 210/510 |

*Primary Examiner*—Bernard Nozick
*Attorney*—H. Vincent Harsha, Harold M. Knoth, William A. Murray, John M. Nolan and Raymond L. Hollister

[57] ABSTRACT

An air filter includes a hollow container with an air inlet, an air outlet, and a filter element in the container between the inlet and outlet. The filter element is made of a mass of polystyrene beads fused into a rigid block, the air passing through the interstices between the beads, which are electrostatically charged and collect the contaminants from the air. The filter element has a large number of overlapping finger-like passages extending from the opposite sides of the filter to increase the effective filtering area for a given filter size.

7 Claims, 3 Drawing Figures

PATENTED AUG 1 1972  3,680,287

INVENTORS
C. D. WOOD
S. A. OLSEN
J. C. POTTER

AIR FILTER

BACKGROUND OF THE INVENTION

This invention relates to an air filter and more particularly to an improved air filter for removing contaminants from engine combustion air or the like.

A wide variety of different materials have been used in air filter elements. For example, it is known to use paper, porous granular minerals, woven or packed fiber glass or plastic yarns, glass or plastic beads, or foamed plastic material, such as polyurethane foam, the particular filter material depending generally on the application in which the filter is used. The filtration of engine combustion air has long presented a problem, particularly for engines operating in very dirty or dusty conditions, such as the engines in agricultural tractors or other off-the-road vehicles. Most of said vehicles currently use either an oil bath-type filter or a paper filter. However, such filters must be frequently cleaned and replaced at intervals, which is time consuming and expensive. Moreover, turbine engines are being more widely used in dirty environments, such as in large off-the-road vehicles, trucks, or in helicopters, which must land and take off in dusty environments, and such engines produce a new dimension to the filtering problem, since they require a large volume of very clean combustion air at a relatively low pressure drop. In most applications, the size and the weight of the filter are also of critical importance, and the widely used paper and oil bath filters are generally of excessive size when used for turbine engines.

SUMMARY OF THE INVENTION

According to the present invention, an improved air filter is provided, having particular utility for filtering engine combustion air. More particularly, an air filter is provided wherein the air is passed through a mass of fused, plastic, electrostatically chargeable beads, the air passing through the interstices between the beads while the contaminants are deposited on the electrostatically charged beads.

An important feature of the invention resides in the fact that the filter is inexpensive and can be easily, and inexpensively replaced or cleaned.

Another feature of the invention resides in the fact that the filter has a much greater dust-holding capacity than conventional combustion air filters.

Still another feature of the invention is the configuration of the filter, which permits a relatively high capacity for a given size filter.

DESCRIPTION OF THE PREFERRED EMBODIMENT

Figure 1:
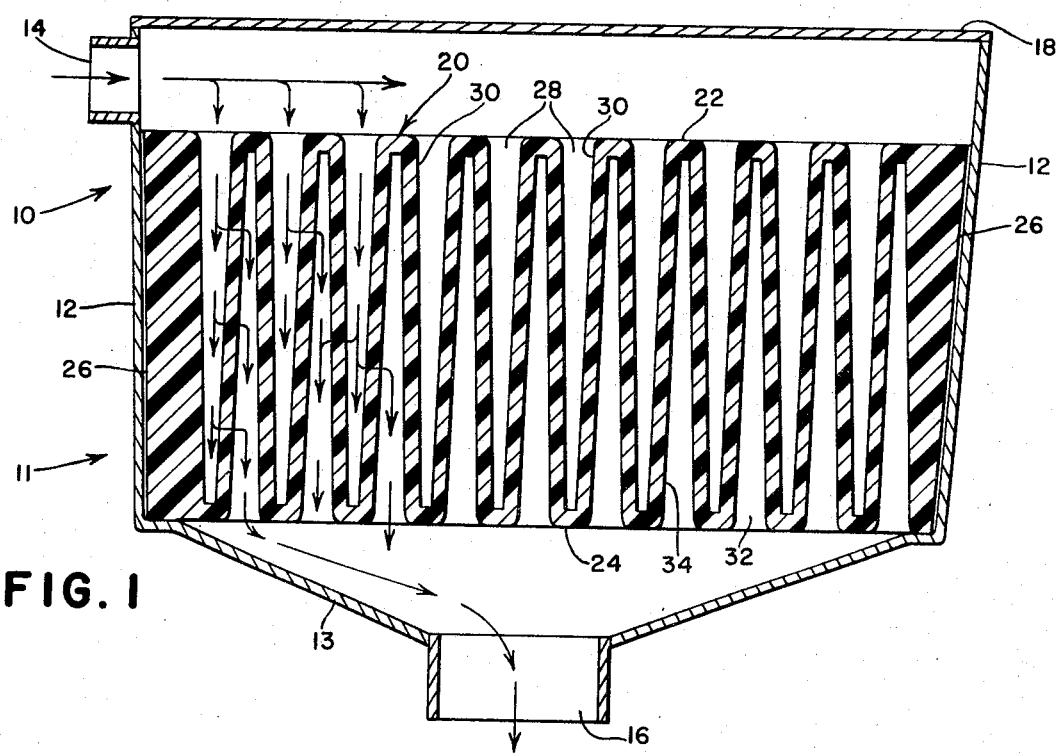
FIG. 1 is a vertical section through the filter.
Figure 2:
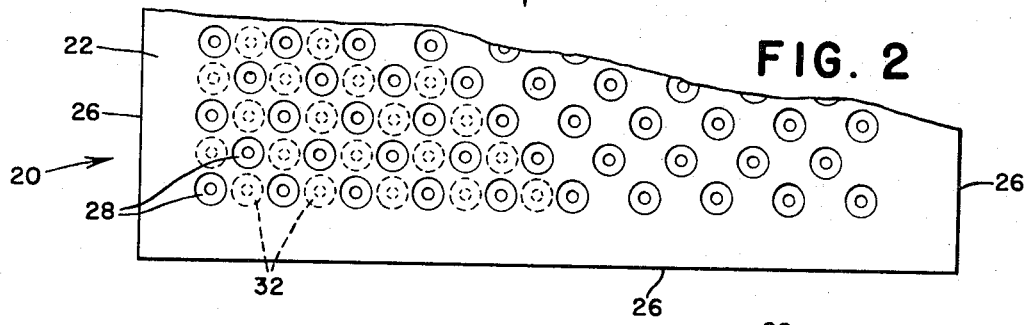
FIG. 2 is a partial plan view of the filter element shown in FIG. 1, only a portion of recesses in the element being illustrated.

The invention is embodied in an air filter including an air filter container, indicated generally by the numeral 10, having a receptacle-like bottom portion 11 with four generally upright side walls 12 and a generally square bottom wall 13. An air inlet 14 is provided in the top of one of the side walls 12 and an air outlet 16 is provided centrally in the bottom wall 13. The container is closed by a removable lid 18, which permits access to a removable filter element, indicated in its entirety by the numeral 20. The filter element has substantially the same horizontal cross-sectional dimensions as the bottom portion of the container and seats on the outer part of the bottom wall 13, which is inclined inwardly and downwardly to permit air flow from substantially the entire filter element to the air outlet 16. As is apparent, the filter element closes the container 10 between the air inlet and air outlet, so that air flow through the filter must pass through the filter element 20.

The filter element has a square top or inlet side 22, a square bottom or outlet side 24, and four generally upright side walls 26, the side walls 26 like the side walls 12 of the container 10 tapering slightly inwardly toward the bottom. Of course, the above orientation and uses of such words as "top," "bottom," "horizontal," etc., are for convenience only, and are not to be construed as limiting the orientation of the filter.

The filter element has a large number of finger-like generally cylindrical recesses or holes 28 on its top or inlet side 22. The recesses 28 have generally cylindrical walls 30 and extend from the top or inlet side 22 to a short distance from the bottom or outlet side 24. Preferably the walls 30 have a slight inward taper so that the recesses 28 are not exactly cylindrical but rather somewhat frusto-conical in shape. In the illustrated embodiment, the recesses are disposed in a regular pattern and are equally spaced in 20 staggered rows of 10 recesses or holes 28. Thus, there is a total of 200 recesses or holes 28 in the top or inlet side of the filter element and each recess is closely spaced to the four diagonally adjacent recesses. Of course, the above pattern and number of recesses is for the purpose of illustration only, and other arrangements and configurations for the filter element could be provided within the scope of the invention. A similar number of finger-like, generally cylindrical or frusto-conical recesses or holes 32 extend upwardly from the bottom or outlet side 24 of the filter element and have slightly tapered side walls 34. The recesses 32 extend upwardly to a relatively short distance from the top or inlet side 22 and are arranged in the same pattern as the recesses in the top side, the recesses in the bottom side being slightly offset from the recesses 28 so that they extend into the space between the top side recesses in over-lapping or inter-digitating fashion.

As is apparent from FIG. 1, the walls 30 of the top recesses 28 are relatively close to the walls 34 of the bottom recesses 32. As indicated by the arrows in FIG. 1, the air passing through the filter enters the container 10 through the air inlet 14 and flows into the top side recesses 28, from which it moves transversely in through the walls 30, through the porous filter element material, and out through the walls 34 to the recesses or holes 32 on the bottom side of the filter element, from which it moves through the air outlet 16. Thus, since the walls of the recesses 28 and 32 serve as the filtering area, a relatively large filtering area is provided for a given size of filter element.

The filter element 20 is a rigid block made of fused polystyrene beads. The beads are preferably in the range of 500-700 microns in size, which is approximately the size of relatively fine sand, and are commercially available as "Dylene 8," such polystyrene beads being widely used to cast polystyrene articles by melting the beads. The polystyrene beads have several important characteristics that make them ideal for the fused filter element. First, the beads are electrostatically chargeable and will receive and maintain an electrostatic charge from the air passing through the filter. The electrostatically charged beads, of course, attract and hold the airborne dust and other contaminants. Secondly, the polystyrene beads are readily available and relatively inexpensive. And thirdly, the polystyrene beads can be fused into a porous rigid block.

The 500-700 micron bead size has been found to be suitable for engine combustion air and provides much more dust capacity than a conventional paper filter, particularly at higher air velocities. However, a larger bead size of up to 900 microns could be used, providing a greater dust-holding capacity with a reduced efficiency. Similarly, a bead size of down to 300 microns could be used to provide a very efficient filter, with a small dust-holding capacity.

Figure 3:
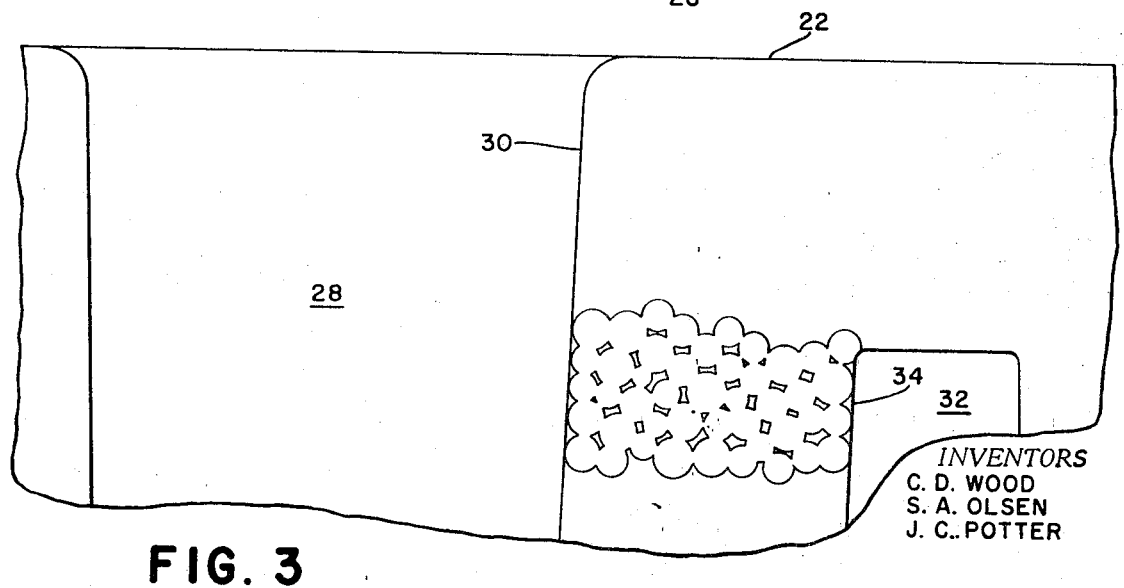
FIG. 3 is an enlarged view of a broken-away portion of the filter element, showing the arrangement of the fused beads in the filter element.

The detailed construction of the fused filter element is best shown in FIG. 3. As is apparent, the beads are fused to the adjacent beads only at their points of contact with the adjacent beads, the space between the beads remaining open. The open spaces or interstices between the beads are interconnected, so that the air can pass in a tortuous path through the interconnected interstices from one side of the filter element to the other. As is apparent, the greater the distance that the air has to travel from one side of the filter element to the other, the more efficient the filter and the greater the pressure drop. In the illustrated embodiment, the minimum distance between the recesses on the opposite sides of the filter element is approximately 0.5 cm, so that the air must travel through at least 0.5 cm of the filter element.

The illustrated fused filter element is made by filling a mold with the loose polystyrene beads, the mold having 200 tapered fingers, shaped like the recesses 28, depending from the top of the mold and another 200 tapered fingers, shaped like the recesses 32, projecting upwardly from the bottom of the mold and being offset from the top fingers as is apparent from FIG. 1. The tapered fingers facilitate the separation of the mold from the filter element. While in the mold, the beads are heated to fusion temperature, which is slightly below the melting point of the beads, but sufficiently high for the adjacent beads to fuse with one another at their points of contact. This has been accomplished by baking the beads while in the mold in an over for 2 hours at a temperature between 290° F. and 310° F.

Other methods of fusing the beads could also be used, such as ultrasonically or induction heating the beads. A solvent could also be used to soften the periphery of the beads to a point where they will fuse with their adjacent beads at their point of contact, the solvent then being evaporated.

After fusion, the filter element is a rigid block, and can easily be handled and installed in or removed from the container. The fused filter element can also easily be cleaned. The preferred method of cleaning is to wash the element in water containing a detergent, the water removing the electrostatic charge from the beads so that the dirt is easily flushed away. The filter is then back-flushed with clean water. The filter element could also be washed in various types of solvents, provided, of course, that the solvent will not attack the filter material. The filter can also be easily cleaned by back-flushing with water only, using an ordinary garden hose, or even back-flushed with air, although the latter method is not as efficient since the electrostatic charge tends to hold the contaminants in the filter. As is apparent from the above, the filter element is simple and inexpensive to manufacture, and can easily be replaced or removed for cleaning so that it can advantageously be used to filter the combustion air on those machines operating in a dirty or dusty environment, wherein the air filters are typically serviced once a day.

What is claimed is:

1. An air filter element comprising: a mass of generally spherical polystyrene beads between 400 and 800 microns in size, each bead being fused to adjacent beads at its points of contact with the adjacent beads to form a rigid porous mass having opposite air inlet and air outlet sides, each side having a plurality of recesses with side walls, at least a portion of the air passing through the filter element moving through the walls of the recesses on the inlet side and out through the walls of the recesses on the outlet side, the air passing in tortuous paths along the interstices between the beads, whereby contaminants in the air are deposited on the beads.

2. The invention defined in claim 1 wherein the recesses are elongated holes and extend inwardly from the opposite side of the filter element in inter-digitating fashion, the recesses in the inlet side of the element being offset from the recesses in the outlet side.

3. An air filter element comprising: a mass of thermoplastic, electrostatically chargeable beads, between 300 and 900 microns in size, fused together to form a rigid block with open interconnected interstices between the beads adapted to pass air in a tortuous path, the block having an air inlet side with a plurality of elongated holes extending inwardly from the inlet side more than halfway through the block but not through the block and an air outlet side opposite the air inlet side and having a plurality of elongated holes extending inwardly more than halfway through the block but not through the block toward the air inlet side, the side walls of the holes on the inlet side being closely spaced to the side walls of the outlet side holes so that substantially all the air passes in through the walls of the holes on the inlet side and out through the walls of the holes on the outlet side.

4. The invention defined in claim 3 wherein the holes have a relatively small width compared to their depth and extend close to the opposite side in interdigitating fashion.

5. An air filter element comprising: a mass of thermoplastic, electrostatically chargeable beads, between 300 and 900 microns in size, fused together to form a rigid mass with open interconnected interstices between the beads adapted to pass air in a tortuous pass through the fused mass, the fused mass of beads having an air inlet side, having a plurality of elongated, generally parallel, frusto-conical holes extending more than halfway through the filter element and arranged in a repeating pattern, and an air outlet side opposite the air inlet side having a plurality of elongated, generally parallel, frusto-conical holes with inwardly tapering side walls and extending more than halfway through the filter element, the holes in the inlet side being offset from the holes in the outlet side so that they are at least partly disposed between the holes in the outlet side whereby most of the air passing through the filter element moves in through the side walls of the holes in the inlet side and out through the side walls of the adjacent holes in the outlet side.

6. The invention defined in claim 5 wherein the beads are polystyrene beads between 400 and 800 microns in size.

7. The invention defined in claim 6 wherein minimum distances between adjacent recesses is between 0.4 and 1 cm.

* * * * *